US010645156B2

(12) United States Patent
Yucelen et al.

(10) Patent No.: US 10,645,156 B2
(45) Date of Patent: May 5, 2020

(54) TOOLS AND METHODS FOR DISTRIBUTED SPATIAL CONTROL OF SWARMS VIA MULTIPLEX INFORMATION NETWORKS

(71) Applicants: Tansel Yucelen, Tampa, FL (US); Dzung Minh Duc Tran, Tampa, FL (US)

(72) Inventors: Tansel Yucelen, Tampa, FL (US); Dzung Minh Duc Tran, Tampa, FL (US)

(73) Assignee: University of South Florida, Tampa, FL (US)

( * ) Notice: Subject to any disclaimer, the term of this patent is extended or adjusted under 35 U.S.C. 154(b) by 161 days.

(21) Appl. No.: 15/838,889

(22) Filed: Dec. 12, 2017

(65) Prior Publication Data
US 2018/0167452 A1    Jun. 14, 2018

Related U.S. Application Data

(60) Provisional application No. 62/432,903, filed on Dec. 12, 2016.

(51) Int. Cl.
*H04L 29/08* (2006.01)
*G01S 17/88* (2006.01)
*H04W 4/80* (2018.01)

(52) U.S. Cl.
CPC ............ *H04L 67/104* (2013.01); *G01S 17/88* (2013.01); *H04L 29/08* (2013.01); *B60W 2556/50* (2020.02); *H04W 4/80* (2018.02)

(58) Field of Classification Search
CPC ....... H04W 4/008; H04W 4/02; H04W 4/027; H04W 4/046; H04W 24/02; H04W 24/10;
(Continued)

(56) References Cited

U.S. PATENT DOCUMENTS 8,855,900 B2 * 10/2014 Lection ................ G08G 1/0145
340/907
9,940,840 B1 * 4/2018 Schubert ............ G01C 21/3407
(Continued)

OTHER PUBLICATIONS

Asllani et al., "Turing instabilities on cartesian product networks," arXiv preprint arXiv:1412.7055, 2014, 11 pages.
(Continued)

*Primary Examiner* — Mansour Oveissi
(74) *Attorney, Agent, or Firm* — Thomas | Horstemeyer, LLP

(57) ABSTRACT

A method and system for distributed spatial control of a formation of vehicles includes receiving at a first formation vehicle via a peer-to-peer communication interface, direction of travel and formation density information that indicate a course of travel for the first vehicle while travelling as a member of the formation of vehicles. The peer-to-peer formation density information indicates a distance to maintain from other neighboring formation vehicles. A formation vehicle self-navigation command is generated for navigating the first vehicle when travelling in one dimensional, two dimensional, or three dimensional space as a member of the formation of vehicles. The self-navigation command is based on the peer-to-peer direction of travel and formation density information. The direction of travel information is based on locally determined spatial relationships of a portion of the formation of vehicles.

20 Claims, 4 Drawing Sheets

Multi-agent system with six agents including one capable agent (square) and undirected connections

(58) Field of Classification Search
CPC .. H04W 72/1278; H04W 84/18; H04L 67/12; H04L 67/18; H04L 67/104; G01S 5/0072; G01S 13/931; G01S 13/9307; G01S 19/49; G08G 1/0112; G08G 1/0133; G08G 1/0141; G08G 1/166

See application file for complete search history.

(56) References Cited

U.S. PATENT DOCUMENTS

| | | | | |
|---|---|---|---|---|
| 10,310,095 | B2* | 6/2019 | Moura | G01S 19/40 |
| 2005/0156777 | A1* | 7/2005 | King | G01S 3/023 |
| | | | | 342/29 |
| 2006/0045025 | A1* | 3/2006 | Mehyar | H04L 45/02 |
| | | | | 370/254 |
| 2008/0170857 | A1* | 7/2008 | Bardalai | H04B 10/275 |
| | | | | 398/59 |
| 2016/0295624 | A1* | 10/2016 | Novlan | H04W 72/04 |
| 2017/0085437 | A1* | 3/2017 | Condeixa | H04W 4/02 |
| 2017/0270361 | A1* | 9/2017 | Puttagunta | G01C 21/20 |
| 2018/0101169 | A1* | 4/2018 | Applewhite | B64F 1/04 |
| 2018/0326901 | A1* | 11/2018 | Boyle | B60Q 1/503 |
| 2019/0064794 | A1* | 2/2019 | Chen | G05D 1/0016 |

OTHER PUBLICATIONS

Brinón-Arranz et al., "Cooperative control design for time-varying formations of multi-agent systems," IEEE Transactions on Automatic Control, 2014, vol. 59, No. 8, pp. 2283-2288.

Chapman et al., "Controllability and observability of network-of-networks via cartesian products," IEEE Transactions on Automatic Control, 2014, vol. 59, No. 10, pp. 2668-2679.

Chapman et al., "On the controllability and observability of cartesian product networks," in IEEE Conference on Decision and Control, 2012, pp. 80-85.

Cheah et al., "Region-based shape control for a swarm of robots," Automatica, 2009, vol. 45, No. 10, pp. 2406-2411.

Coogan et al., "Scaling the size of a formation using relative position feedback," Automatica, 2012, vol. 48, No. 10, pp. 2677-2685.

De Domenico et al., "Mathematical formulation of multilayer networks," Physical Review X, 2013, 3(4):041022, 15 pages.

Godsil et al., Algebraic graph theory. Springer New York, 2001, vol. 207.

Gomez et al., "Diffusion dynamics on multiplex net-works," Physical review letters, 2013, vol. 110, No. 2, 028701, 5 pages.

Gómez-Gardenes et al., "Evolution of cooperation in multiplex networks," Scientific reports, 2012, 2:620, 7 pages.

Granell et al., "Dynamical interplay between awareness and epidemic spreading in multiplex networks," Physical review letters, 2013, vol. 111, No. 12, 128701, 5 pages.

Hou et al., "Dynamic region following formation control for a swarm of robots," in IEEE Conference on Robotics and Automation, 2009, pp. 1929-1934.

Khalil, Nonlinear systems. Prentice Hall, 1996, vol. 3, p. 172.

Kivelä et al., "Multilayer networks," Journal of Complex Networks, 2014, 2, 203-271.

Mucha et al., "Community structure in time-dependent, multiscale, and multiplex networks," Science, vol. 328, No. 5980, pp. 876-878, 2010.

Nicosia et al., "Measuring and modeling correlations in multiplex networks," Physical Review E, 2015, 92, 032805, 20 pages.

Oh et al., "A survey of formation of mobile agents," in IEEE Symposium on Intelligent Control, 2010, pp. 1470-1475.

Rebollo et al., "Consensus over multiplex network to calculate user influence in social networks," Int. J. Complex Systems in Science, 2013, vol. 3, No. 1, pp. 71-75.

Sole-Ribalta et al., "Spectral properties of the laplacian of multiplex networks," Physical Review E, 2013, vol. 88, No. 3, 032807, 6 pages.

Tran et al., "Multiplex information networks for spatially evolving multiagent formations," 2016 American Control Conference (ACC), Boston, MA, 2016, pp. 1912-1917.

Tran et al., "Control of multiagent formations: A multi-plex information networks-based approach," in Dynamic Systems and Control Conference. American Society of Mechanical Engineers, 2015, 6 pages.

Ven et al., "Distributed consensus of multi-agent systems with general linear node dynamics and intermit-tent communications," International Journal of Robust and Nonlinear Control, 2014, vol. 24, No. 16, pp. 2438-2457.

Yucelen et al., "Active-passive networked multiagent systems," in IEEE Conference on Decision and Control, 2014, pp. 6939-6944.

Yucelen et al., "Control of multivehicle systems in the presence of uncertain dynamics," International Journal of Control, 2013, vol. 86, No. 9, pp. 1540-1553.

* cited by examiner

Multi-agent system with six agents including one capable agent (square) and undirected connections Response of a multi-agent system with distributed control architecture, showing agent trajectories in two dimensional space

TOOLS AND METHODS FOR DISTRIBUTED SPATIAL CONTROL OF SWARMS VIA MULTIPLEX INFORMATION NETWORKS

CROSS-REFERENCE TO RELATED APPLICATION(S)

This application is a non-provisional of and claims the benefit of U.S. Provisional Patent Application Ser. No. 62/432,903, filed on Dec. 12, 2016, the entire contents of which are incorporated herein by reference.

TECHNICAL FIELD

Embodiments of the invention generally relate to methods and systems for spatial control of a formation of vehicles. More particularly, certain embodiments are directed to distributed spatial control of a formation or swarm of vehicles.

BACKGROUND OF THE INVENTION

As advances in VLSI and MEMS technologies have boosted the development of integrated microsystems that combine mobility, computing, communication, and sensing on a single platform, military and civilian operations develop the capability to exploit large numbers of interconnected agents such as low-cost and small-in-size autonomous vehicles and microsensors. Such large-scale multi-agent systems will support operations ranging from environment monitoring and military surveillance, to guidance, navigation, and control of autonomous underwater, ground, aerial, and space vehicles.

Yet, current distributed control methods lack information exchange infrastructures to enable spatially evolving multi-agent formations. This is due to the fact that these current methods are designed based on information exchange rules for a network having a single layer, which leads to multi-agent formations with fixed, non-evolving spatial properties. For situations where capable agents have to control the resulting formation through these methods, they can only do so if such vehicles have global information exchange ability. For example, global information may include scaling factor and rotation angle to control the density and orientation of the formation that is communicated to all agents in the network from capable agents. Therefore, it requires capable agents to globally communicate and/or broadcast global information to every single agent in the network. However, such global information exchange is not practical for cases involving large numbers of agents and low-bandwidth peer-to-peer communications.

Studies on multiplex information networks have recently emerged in physics and network science literature. The studies consider system-theoretic characteristics of network dynamics with multiple layers subject to intra-layer and interlayer information exchange. There also exist studies on multiplex networks that do not consider system-theoretic characteristics. However, these studies mainly consider cases where all layers perform simple consensus algorithms and analyze the convergence of the overall multiagent systems in the presence of not only intra-layer but also interlayer information exchange, and hence, they do not deal with controlling spatial properties of multiagent formations. Moreover, there are recent studies on networks of networks. However, these studies deal with large-scale systems formed from smaller factor networks via graph Cartesian products and are not related.

Spatial multiagent formation control and formation density control in particular have been considered. However, formation design parameters were known globally by all agents, and global knowledge of the complete network at the analysis stage was assumed. Such an approach may not be practical in the presence of large numbers of agents and low-bandwidth peer-to-peer communications. Moreover, from a data security point of view, a multiagent system with all agents sharing some global information about an operation of interest may not be desired.

SUMMARY OF THE INVENTION

In one embodiment, a method for distributed spatial control of a formation of vehicles includes receiving, via a peer-to-peer communication interface system of a first vehicle of the formation of vehicles, peer-to-peer direction of travel information. The peer-to-peer direction of travel information indicates a course direction for the first vehicle of the formation of vehicles while travelling as a member of the formation of vehicles. Peer-to-peer formation density information is also received. The peer-to-peer formation density information indicates a distance to maintain from other vehicles of the formation of vehicles while travelling as a member of the formation of vehicles. A formation vehicle self-navigation command is generated for navigating a vehicle platform of the first vehicle of the formation of vehicles when travelling in one dimensional, two dimensional, or three dimensional space as a member of the formation of vehicles. The formation vehicle self-navigation command is based on the peer-to-peer direction of travel information and the peer-to-peer formation density information. The peer-to-peer direction of travel information is based on locally determined spatial relationships of a portion of the vehicles of the formation of vehicles.

In another embodiment, a formation vehicle for distributed spatial control of a formation of vehicles includes a peer-to-peer communication interface system, a vehicle platform for travelling in one dimensional, two dimensional, or three dimensional space among the formation of vehicles, an electronic processor, and a memory that stores program instructions. When the program instructions are executed by the electronic processor, the program instructions cause the electronic processor to receive, via the peer-to-peer communication interface system peer-to-peer direction of travel information. The peer-to-peer direction of travel information indicates a course direction for the formation vehicle while travelling as a member of the formation of vehicles. The electronic processor further receives, via a second peer-to-peer communication interface, peer-to-peer formation density information. The peer-to-peer formation density information indicates a distance to maintain from other vehicles of the formation of vehicles while travelling as a member of the formation of vehicles. The electronic processor further generates a formation vehicle self-navigation command for navigating the vehicle platform when travelling in one dimensional, two dimensional or three dimensional space as a member of the formation of vehicles. The formation vehicle self-navigation command is based on the peer-to-peer direction of travel information and the peer-to-peer formation density information. The peer-to-peer direction of travel information is based on locally determined spatial relationships of a portion of the vehicles of the formation of vehicles.

In yet another embodiment, a large-scale multiagent system comprises a plurality of agents, a multiplex information network, and a controller in communication with the multiplex information network. The large-scale multiagent system is configured to generate a distributed control signal for each of the agents that allows the agents to generate a desired formation and density for tracking a target of interest.

Other aspects of the embodiments will become apparent by consideration of the detailed description and accompanying drawings.

DETAILED DESCRIPTION

Figure 1:
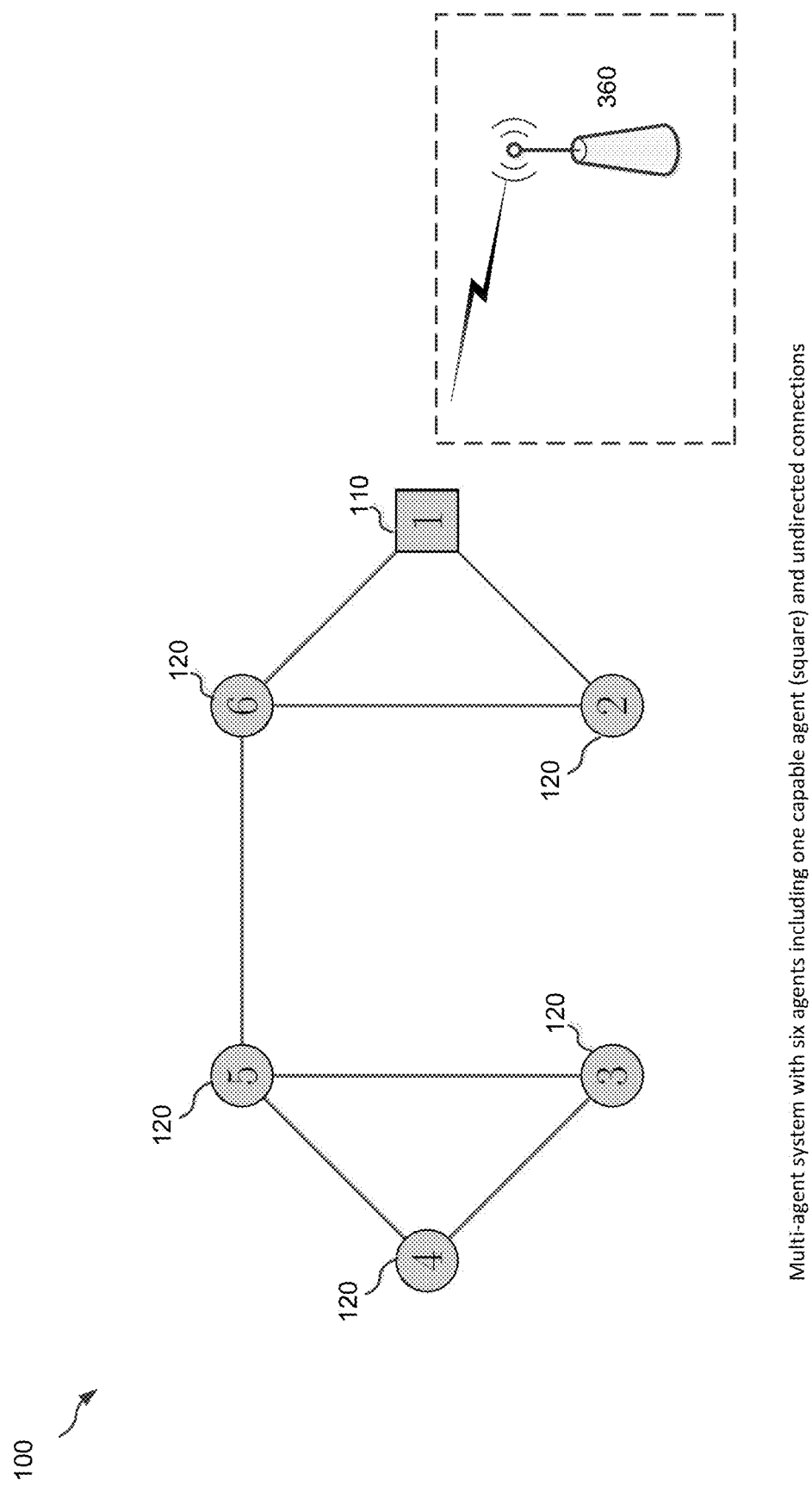
FIG. 1 is a representation of a multiagent system having six agents of a distributed control architecture for spatial control of the multiagent system, according to some embodiments.

Before any embodiments are explained in detail, it is to be understood that the disclosure is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be utilized to implement embodiments described herein. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of embodiments described herein may be implemented in software (for example, stored on non-transitory computer-readable medium) executable by one or more processors. As such, it should be noted that a plurality of hardware and software based devices, as well as a plurality of different structural components may be utilized to implement the described embodiments. For example, "controllers," "logic," "generators," or "interfaces" described in the specification may include one or more electronic processors, one or more memory modules including non-transitory computer-readable medium, one or more input/output interfaces, and various connections (for example, a system bus) connecting the components. In some instances, the controllers described in the specification may be implemented in one of or a combination of a general processor, an application specific integrated circuit (ASIC), a digital signal processor (DSP), a field programmable gate array (FPGA), or the like.

In order to perform future multiagent formation operations with dramatically increasing levels of complexity, multiagent systems require advanced distributed information exchange rules that enable these systems to evolve spatially for adapting to dynamic environments and effectively responding to human interventions. A communication topology for these agents within a network may be represented as an undirected and connected graph. Hence, the communication between an agent and its neighbors may comprise two-way communication, and each agent may exchange only its local measurements or knowledge.

Multiagent systems with first-order dynamics information exchange rules represented by multiplex information networks can be designed for enabling spatially evolving multiagent formations. A multilayer network or multiplex information network architecture may comprise a network with multiple layers of consensus in that there is a main layer to form a desired multiagent formation and other layers that are used to adjust the multiagent formation properties, such as scaling and rotating the multiagent formation. A novel, generalized multiplex information networks architecture for spatial control of multiagent systems with realistic, general linear dynamics is provided. Specifically, multiplex information networks are utilized for formation density control of multiagent systems. The proposed approach allows capable agents to spatially alter density of a resulting multiagent formation while tracking a target of interest. This approach does not require any global information exchange ability with the multiple agents of the multiagent formation. System-theoretic stability and convergence properties of the proposed distributed control architecture are provided. A multiagent formation may be referred to as a formation, and may comprise a formation of vehicles that travel in a one dimensional, a two dimensional or a three dimensional space, for example.

As follows, in one section, notation and mathematical preliminaries are introduced to develop the main results of the embodiments. System-theoretic stability and convergence properties of the proposed distributed control architecture are derived and discussed another section. In a further section, an illustrative numerical example is provided to demonstrate the efficacy of the proposed architecture.

In this section, notation used throughout the embodiment and some basic notions from graph theory are covered. Necessary lemmas are included to develop the main results of the embodiments.

Notation:

Throughout, $\mathbb{R}$ denotes the set of real numbers, $\mathbb{R}^n$ denotes the set of n×1 real column vectors, $\mathbb{R}^{n \times m}$ denotes the set of n×m real matrices, $\mathbb{R}_+$ denotes the set of positive real numbers, $\mathbb{R}_+^{n \times n}$ (resp., $\overline{\mathbb{R}}_+^{n \times n}$) denotes the set of n×n positive-definite (resp., hnonnegative-definite) real matrices, $\mathbb{S}_+^{n \times n}$ (resp., $\overline{\mathbb{S}}_+^{n \times n}$) denotes the set of n×n symmetric positive-definite (resp., symmetric nonnegative-definite) real matrices, $\mathbb{Z}$ denotes the set of integers, $\mathbb{Z}_+$ (resp., $\overline{\mathbb{Z}}_+$) denotes the set of positive (resp., nonnegative) integers, $0_n$ denotes the n×1 vector of all zeros, $1_n$ denotes the n×1 vector of all ones, $0_{n \times n}$ denotes the n×n zero matrix, and $I_n$ denotes the n×n identity matrix. In addition, we write $(\cdot)^T$ for transpose, $(\cdot)^{-1}$ for inverse, $\|\cdot\|_2$ for the Euclidian norm $\|\cdot\|_F$ for the Frobenius norm, $\lambda_{min}(A)$ (resp. $\lambda_{max}(A)$) for the minimum (resp., maximum) eigenvalue of the Hermitian matrix A, $\lambda_i(A)$ for the i-th eigenvalue of A (A is symmetric and the eigenvalues are ordered from least to greatest value), and diag(a) for the diagonal matrix with the vector a on its diagonal.

Basic Notions from Graph Theory:

In the multiagent literature, graphs are broadly adopted to encode interactions in networked systems. An undirected graph G is defined by a set $V_G=\{1, \ldots, N\}$ of nodes and a set $E_g \subset V_g \times V_g$ of edges. If $(i, j) \in E_g$, then the nodes i and j are neighbors and the neighboring relation is indicated with i~j. The degree of a node is given by the number of its neighbors. Letting $d_i$ be the degree of node i, then the degree matrix of a graph G, $D(G) \in \mathbb{R}^{N \times N}$, is given by $$D(G) \triangleq \text{diag}(d), d=[d_1, \ldots, d_N]^T.$$

A path $i_0 i_1 \ldots i_L$ is a finite sequence of nodes such that $i_{k-1} \sim i_k$, $k=1, \ldots, L$, and a graph G is connected if there is a path between any pair of distinct nodes. The adjacency matrix of a graph G, $A(G) \in \mathbb{R}^{N \times N}$, is given by $$[A(G)]_{ij} \triangleq \begin{cases} 1, & \text{if } (i, j) \in Eg \\ 0, & \text{otherwise} \end{cases}.$$

The Laplacian matrix of a graph, $L(G) \in \overline{S}_+^{n \times n}$, playing a central role in many graph theoretic treatments of multiagent systems, is given by $$L(G) \triangleq D(G) - A(G).$$

Throughout the embodiments, we model a given multi-agent system by a connected, undirected graph G, where nodes and edges represent agents and inter-agent communication links, respectively.

Lemmas:

The following lemmas are utilized to develop the main results of the embodiments.

Lemma 1:

The spectrum of the Laplacian of a connected, undirected graph can be ordered as $$0 = \lambda_1(L(G)) < \lambda_2(L(G)) \leq \ldots \leq \lambda_N(L(G)), \quad (2)$$

with $1_n$ as the eigenvector corresponding to the zero eigenvalue $\lambda_1(L(G))$ and $$L(G)1_N = 0_N. \quad (3)$$

Lemma 2:

Let $$G = [\mu_1, \mu_2, \ldots, \mu_N]^T, \quad (4)$$

$\mu_i \in \mathbb{Z}_+$, $i=1, \ldots N$, and assume and at least one element of G is nonzero. Then, for the Laplacian of the connected, undirected graph, $$F \triangleq L(G) + \text{diag}(G), \quad (5)$$

is a positive matrix.

Lemma 3:

Let $A_1 \in \mathbb{R}^{n \times n}, A_2 \in \mathbb{R}^{n \times n}, A_3 \in \mathbb{R}^{m \times n}$ and $A_4 \in \mathbb{R}^{m \times m}$, If A1 and $A_4 - A_3 A_1^{-1} A_2$ are nonsingular, then $$\begin{bmatrix} A1 & A2 \\ A3 & A4 \end{bmatrix}^{-1} = \begin{bmatrix} M1 & M2 \\ M3 & M4 \end{bmatrix}, \quad (6)$$

Where $$M_2 = -A_1^{-1} A_2 (A_4 - A_3 A_1^{-1} A_2)^{-1}.$$

System:

Consider a system with N agents exchanging information among each other using their local measurements according to a connected, undirected graph G. Specifically, let the dynamics of each agent be described by $$\dot{x}_i(t) = Ax_i(t) + Bu_i(t), x_i(0) = x_{i0}, \quad (7)$$

$$y_i(t) = Cx_i(t) \quad (8)$$

where for agent i, $i=1, \ldots, N$, $x_i(t) \in \mathbb{R}^n$ denotes the state vector, $u_i(t) \in \mathbb{R}^m$ denotes the control vector, and $y_i \in \mathbb{R}^p$ denotes the output vector with $p \leq n$. In (7) and (8), in addition, $A \in \mathbb{R}^{n \times n}$ denotes the system matrix, $B \in \mathbb{R}^{n \times m}$ denotes the control input matrix, and $C \in \mathbb{R}^{p \times n}$ denotes the output matrix such that the triple (A, B, C) is minimal.

Distributed Controller Architecture:

The objective is to design a distributed control signal $u_i(t)$, for each agent i, $i=1, \ldots, N$ such that the resulting multiagent system not only generates a desired formation but also the density of this formation is spatially altered by capable agents while tracking a target of interest, without requiring global information exchange ability. For this purpose, the distributed control architecture given by $$u_i(t) = -K_1 x_i(t) - K_2 z_i(t), \quad (9)$$

$$\dot{z}_i(t) = \Sigma_{i \sim j}(y_i(t) - \xi_i(t) - y_j(t) + \xi_j(t)) + \mu_i(y_i(t) - \xi_i(t) - c(t)) \quad (10)$$

here $K_1 \in \mathbb{R}^{m \times n}$ and $K_2 \in \mathbb{R}^{m \times p}$ are feedback controller gain matrices, $z_i(t) \in \mathbb{R}^p$ is the integral state vector, and $c(t) \in \mathbb{R}^p$ is the position of a target of interest (i.e., command to be followed by the multiagent system). In (10), in addition, $\xi_i(t) \in \mathbb{R}^p$ denotes $$\xi_i(t) \triangleq \gamma_i(t) \xi_i^* \quad (11)$$

where $\xi_i^* \in \mathbb{R}^p$ captures a desired formation objective, $\gamma_i(t) \in \mathbb{R}$ is an additional network layer satisfying $$\dot{\gamma}_i(t) = -\alpha \Sigma_{i \sim j}(\gamma_i(t) - \gamma_j(t)) - \mu_i \alpha(\gamma_i(t) - \gamma^*(t)), \quad (12)$$

with $\gamma^*(t) \in \mathbb{R}$ being the scaling factor for the density of the resulting formation and $\alpha > 0$, and $\mu_i = 1$ only for capable (i.e., leader) agents and it is zero otherwise. It is assumed that there is at least one capable agent in the multiagent system.

In the rest of this section, a system-theoretic analysis is performed and conditions are shown that yield $y_i(t) \to c + \xi_i^* \gamma^*$, $i=1, \ldots, N$, asymptotically for the case when the position of the target and the scaling factor for the density of the resulting formation are constants (i.e., $c(t) \equiv c$ and $\gamma^*(t) \equiv \gamma^*$, respectively) and approximately otherwise.

Stability and Convergence Analysis:

Two assumptions are introduced on the selection of the feedback controller gain matrices in (9).

Assumption 1:

There exists $K_1$ and $K_2$ such that $$H \triangleq \begin{bmatrix} A - BK_1 & -BK_2 \\ \lambda_i C & 0 \end{bmatrix}, \quad (13)$$

is Hurwitz for all $\lambda_i$, $i=1, \ldots, n$, where $\lambda_i \in \text{spec}(F)$, $F \triangleq L(G) + \text{diag}(G)$, and $G \triangleq [\mu_1, \mu_2, \ldots, \mu_N]^T$ with $L(G) \in \overline{S}_+^{N \times N}$ and $F \in S_+^{N \times N}$ by Lemmas 1 and 2, respectively.

Assumption 2:

There exists $K_1$ and $K_2$ such that $$J \triangleq C\overline{A}^{-1}\overline{B}, \quad (14)$$

is invertible, where $J \in \mathbb{R}^{p \times p}$, $\overline{A} \triangleq A - BK_1 \in \mathbb{R}^{n \times n}$, and $\overline{B} \triangleq BK_2 \in \mathbb{R}^{n \times p}$.

Next, let the aggregated vectors be given by $$x(t) = [x_1(t), x_2(t), \ldots, x_N(t)]^T \in \mathbb{R}^{Nn} \quad (15)$$

$$\xi(t) = [\xi_1(t), \xi_2(t), \ldots, \xi_N(t)]^T \in \mathbb{R}^{Np} \quad (16)$$

and $$\xi(t) = \begin{bmatrix} \xi_i^* & 0 \\ & \ddots & \\ 0 & & \xi_{Ni}^* \end{bmatrix} \begin{bmatrix} yi(t) \\ \vdots \\ yN(t) \end{bmatrix} \triangleq \psi\gamma(t). \quad (17)$$

Using these vectors, (7), (8), (10), and (12) can now be written in a compact form as $$\dot{x}(t) = (I_N \otimes A)x(t) + (I_N \otimes B)u(t), \quad (18)$$

$$y(t) = (I_N \otimes C)x(t), \quad (19)$$

$$\dot{z} = (F \otimes C)x(t) - (F \otimes I_p)\psi\gamma(t) - (G \otimes I_p)c(t), \quad (20)$$

$$\dot{\gamma}(t) = -\alpha F\gamma(t) + \alpha G\gamma^*(t). \quad (21)$$

For the result in the next theorem, we assume that the position of the target and the scaling factor for the density of the resulting formation are constants (i.e., $c(t) \equiv c$ and $\gamma^*(t) \equiv \gamma^*$, respectively).

Theorem 1:

Consider the multiagent system given by (7),(8), where N agents exchange information among each other using their local measurements according to a connected, undirected graph G. In addition, consider the distributed controller architecture given by (9), (10), and (12) subject to Assumptions 1 and 2. If the position of the target and the scaling factor for the resulting formation are constants, then $\lim_{t\to\infty} y_i(t) = c + \xi_i^* \gamma^*$, $i = 1, \ldots, N$.

Proof

Let $$q(t) \triangleq [x^T(t), z^T(t), \gamma^T(t)]^T \in \mathbb{R}^{N(n+p+1)}, \quad (22)$$

$$p_c(t) \triangleq [c^T(t), \gamma^*(t)]^T \in \mathbb{R}^{p+1}. \quad (23)$$

Since $c(t)$ and $\gamma^*(t)$ are both constants, then $p_c(t) \equiv p_c$. Note that (18), (20), and (21) can be rewritten in a compact form as $$\dot{q}(t) = A_q q(t) + B_q p_c, \quad (24)$$

Where $$A_q \triangleq \begin{bmatrix} I_N \otimes (A - BK_1) & -I_N \otimes BK_2 & 0 \\ F \otimes C & 0 & -(F \otimes I_p)\psi \\ 0 & 0 & -\alpha F \end{bmatrix}, \quad (25)$$

$$B_q \triangleq \begin{bmatrix} 0 & 0 \\ -G \otimes I_p & 0 \\ 0 & \alpha G \end{bmatrix}. \quad (26)$$

Note from Assumption 1 that $$\begin{bmatrix} I_N \otimes (A - BK_1) & -I_N \otimes BK_2 \\ F \otimes C & 0 \end{bmatrix}, \quad (27)$$

is Hurwitz (see, for example, [25]). In addition, note from Lemma 2 that $-\alpha F$ is Hurwitz since $\alpha > 0$. Then, it follows from the upper triangular structure in (25) that $A_q$ is Hurwitz.

Since $A_q$ is Hurwitz, then there exists a unique positive-definite matrix $P_q$ such that $$0 = A_q^T P_q + P_q A_q + R_q, \quad (28)$$

holds for a positive-definite matrix $R_q$. Now, consider the Lyapunov function candidate given by $$V(q + A_q^{-1} B_q p_c) = (q + A_q^{-1} B_q p_c)^T P_q (q + A_q^{-1} B_q p_c). \quad (29)$$

Note that $A_q$ is invertible (since it has a nonzero determinant), $V(0) = 0$, $V(q + A_q^{-1} B_q p_c) \neq 0$ for all $q + A_q^{-1} B_q p_c$) is radially unbounded. The time derivative of (29) along the trajectory of (24) is given by $$\dot{V}(\cdot) = (q(t) + A_q^{-1} B_q p_c)^T (A_q^T P_q + P_q A_q) \cdot \quad (30)$$
$$(q(t) + A_q^{-1} B_q p_c)$$
$$= -(q(t) + A_q^{-1} B_q p_c(t))^T R_q \cdot$$
$$(q(t) + A_q^{-1} B_q p_c(t)) < 0,$$

And hence, $$\lim_{t\to\infty} q(t) = -A_q^{-1} B_q p_c. \quad (31)$$

Next, since (31) implies $A_q q(t) + B_q p_c \to 0$ as $t \to \infty$, we investigate the steady-state behavior when $$0 = A_q q + B_q p_c. \quad (32)$$

From the last row in (32) we have $$-\alpha F\gamma + \alpha G\gamma^* = 0, \quad (33)$$

or, equivalently, $$\gamma = F^{-1} G\gamma^*. \quad (34)$$

Since $$F 1_N = (\mathcal{L}(\mathcal{G}) + \text{diag}(G)) 1_N \quad (35)$$
$$= \text{diag}(G) 1_N$$
$$= G,$$

Then it follows form (34) that $$\gamma = 1_N \gamma^*, \quad (36)$$

and hence, $$\lim_{t\to\infty} \xi_i(t) = \xi_i^* \gamma^*. \quad (37)$$

From the first two rows of (32), we have $$\begin{bmatrix} I_N \otimes (A - BK_1) & -I_N \otimes BK_2 \\ F \otimes C & 0 \end{bmatrix} \begin{bmatrix} x \\ z \end{bmatrix} = \begin{bmatrix} 0 & 0 \\ G \otimes I_p & F \otimes I_p \end{bmatrix} \begin{bmatrix} c \\ \xi \end{bmatrix}, \quad (38)$$

or, equivalently, $$A_y \tilde{x} = B_y \tilde{c}, \quad (39)$$

Where $A_y$, $B_y$, $\tilde{x}$, and $\tilde{c}$ in (39) correspond to the terms in (38), and hence, $$\tilde{x} = A_y^{-1} B_y \tilde{c}, \quad (40)$$

Now, let $$E_y \triangleq [1_N \otimes C0], \quad (41)$$

then it follows from (40) that $$y = E_y A_y^{-1} B_y \tilde{c}, \quad (42)$$

Finally, since Assumption 2 holds, $A_y^{-1}$ exists. Let $$A_y^{-1} = \begin{bmatrix} M_1 & M_2 \\ M_3 & M_4 \end{bmatrix}. \quad (43)$$

Note from Lemma 3 that $$M_2 = F^{-1} \otimes \overline{A}^{-1} \tilde{B} (C A^{-1} \overline{B})^{-1}. \quad (44)$$

Now, it follows from (42) that $$\begin{aligned}
y &= [I_N \otimes C \quad 0] \begin{bmatrix} M_1 & M_2 \\ M_3 & M_4 \end{bmatrix} \begin{bmatrix} 0 & 0 \\ G \otimes I_p & F \otimes I_p \end{bmatrix} \begin{bmatrix} c \\ \xi \end{bmatrix} \\
&= [I_N \otimes C \quad 0] \begin{bmatrix} M_2(G \otimes I_P) & M_2(F \otimes I_P) \\ M_4(G \otimes I_P) & M_4(F \otimes I_P) \end{bmatrix} \begin{bmatrix} c \\ \xi \end{bmatrix} \\
&= [(I_N \otimes C) M_2 (G \otimes I_P) \quad (I_N \otimes C) M_2 (F \otimes I_P)] \begin{bmatrix} c \\ \xi \end{bmatrix} \\
&= (I_N \otimes C) M_2 (G \otimes I_P) c + (I_N \otimes C) M_2 (F \otimes I_P) \xi \\
&= \left( F^{-1} G \otimes C \overline{A}^{-1} \overline{B} (CA^{-1} \overline{B})^{-1} \right) c + \\
&\quad \left( F^{-1} F \otimes C \overline{A}^{-1} \overline{B} (CA^{-1} \overline{B})^{-1} \right) \xi \\
&= (1_N \otimes I_P) c + (I_N \otimes I_P) \xi.
\end{aligned} \quad (45)$$

Hence, it follows from (37) and (45) that Type equation here. $\lim_{t \to \infty} y_i(t) = c + \xi_i^* \gamma^*$, $i=1, \ldots, N$.

Theorem 1 shows for the case when $c(t) \equiv c$ and $\gamma^*(t) \equiv \gamma^*$ that the proposed distributed control architecture given by (9), (10), and (12) not only generates a desired formation but also spatially alters the density of the resulting formation.

In the next theorem, a more practical case is considered when the position of the target and the scaling factor for the density of the resulting formation are time-varying with bounded time rates of change (i.e., $\|\dot{c}(t)\|_2 \leq \beta_1$ and $\|\dot{\gamma}^*(t)\|_2 \leq \beta_2$).

Theorem 2:

Consider the multiagent system given by (7), (8), where N agents exchange information among each other using their local measurements according to a connected, undirected graph $\mathcal{G}$. In addition, consider the distributed controller architecture given by (9), (10), and (12) subject to Assumptions 1, and 2. If the position of the target and the scaling factor for the density of the resulting information are time-varying with bounded time rates of change, then $y_i(t)$ converges to a neighborhood of $c(t) + \xi_i \gamma^*(t)$, $i=1, \ldots, N$.

Proof:

In the case when the position of the target and the scaling factor for the density of the resulting formation are time-varying, note that (24) becomes $$\dot{q}(t) = A_q q(t) + B_q p_c(t). \quad (46)$$

Following the arguments from the proof of Theorem 1, the time derivative of (29) along the trajectory of (46) can be computed by $$\dot{V}(\cdot) = -\tilde{q}^T(t) R_q \tilde{q}(t) + 2 \tilde{q}^T(t) P_q A_q^{-1} B_q \dot{p}_c(t) \quad (47)$$

$$\leq -\lambda_{min}(R_q) \|\tilde{q}(t)\|_2^2 + 2 \|\tilde{q}(t)\|_2 \|P_q A_q^{-1} B_q\|_F \beta$$

$$= -\lambda_{min}(R_q) \|\tilde{q}(t)\|_2 (\|\tilde{q}(t)\|_2 - \phi),$$

Where $$\tilde{q}(t) \triangleq q(t) + A_q^{-1} B_q p_c(t), \quad (48)$$

$$\phi \triangleq 2 \|P_q A_q^{-1} B_q\|_F (\beta_1 + \beta_2) / \lambda_{min}(R_q). \quad (49)$$

Therefore, $\dot{V}(\cdot) \leq 0$ outside the compact set $$\Omega \triangleq \{\tilde{q}(t) : \|\tilde{q}(t)\|_2 \leq \phi\}, \quad (50)$$

which proves the ultimate boundedness of the solution $q(t) + A_q^{-1} B_q p_c(t)$ [26], and hence, the result is immediate.

From the proof of Theorem 2, since $\dot{V}(\cdot) \leq 0$ outside the compact set (50), then an ultimate bound for the distance of $\tilde{q}(t) = (t) + A_q^{-1} B_q p_c(t)$ can be computed as $$\|\tilde{q}(t)\|_2 \leq 2 \sqrt{\frac{\lambda_{max}(P_q)}{\lambda_{min}(P_q)}} \frac{\|P_q A_q^{-1} B_q\|_F (\beta_1 + \beta_2)}{\lambda_{min}(R_q)}, t \geq T. \quad (51)$$

Specifically, if the right hand side of (51) is small, then the distance of $q(t) + A_q^{-1} p_c(t)$ is small for $t \geq T$. Following the analysis given in the proof of Theorem 1, a small $q(t) + A_q^{-1} B_q p_c(t)$ implies $y_i(t)$ to stay close to $c(t) + \xi_i^* \gamma^*(t)$, $i=1, \ldots, N$, for $t \geq T$.

Note that if one makes the bandwidth of (46) large by judiciously selecting the distributed controller design parameters and/or if the time rate of change of the position of the target and the scaling factor for the density of the resulting formation are small, then the right hand side of (51) becomes small.

Finally, in addition to controlling the density of the resulting formation, one can also control its orientation by adding an additional network layer. For example, for a two dimensional formation problem, one can use the proposed controller architecture in (9) and (10) with (11) replaced by $$\xi_i(t) \triangleq \gamma_i(t) R(\theta_i(t)) \xi_i^* \in \mathbb{R}^2, \quad (52)$$

where $$R(\theta_i(t)) \triangleq \begin{bmatrix} \cos\theta_i(t) & -\sin\theta_i(t) \\ \sin\theta_i(t) & \cos\theta_i(t) \end{bmatrix} \in \mathbb{R}^{2 \times 2}. \quad (53)$$

In (52), $\gamma_i(t) \in \mathbb{R}$ and $\theta_i(t) \in \mathbb{R}$ are additional network layers respectively satisfying (12) and $$\dot{\theta}_i(t) = -\alpha \sum_{i \sim j} (\theta_i(t) - \theta_j(t)) - \mu_i \alpha (\theta_i(t) - \theta^*(t)), \quad (54)$$

with $\theta^*(t) \in \mathbb{R}$ controlling the orientation of the resulting formation.

Embodiments

FIG. 1 is a representation of a multiagent system having six agents of a distributed control architecture for spatial control of the multiagent system. Referring to FIG. 1, a multiagent system 100 comprises a formation of six agents including a capable agent 110 (denoted by a square), and five other agents 120 (denoted by circles).

In one embodiment, the capable agent 110 and the other agents 120 represent six respective vehicles comprising a capable vehicle 110 and other vehicles 120 in a formation of vehicles of the multiagent system 100. The six vehicles comprise peer-to-peer communication systems for distributed spatial control of the formation of vehicles. Solid lines between the vehicles represent an example of peer-to-peer communication paths for exchanging navigation information among the six vehicles of the multiagent system 100. The peer-to-peer communications may include local measurements made by each of the vehicles that are utilized for the distributed spatial control of the formation of vehicles.

However, in an illustrative numerical example to demonstrate the efficacy of the proposed distributed control architecture, FIG. 1 depicts an undirected graph topology where the solid lines between the agents represent a connected, undirected graph topology, and where a first agent 110 is a capable agent (i.e., $\mu 1=1$ and $\mu i=0$, $i=2, \ldots, 6$). The dynamics of each of the agents is represented by (7) and (8) with $$A = \begin{bmatrix} 0_{3\times3} & I_3 \\ A_1 & A_2 \end{bmatrix}, B = \begin{bmatrix} 0_{3\times3} \\ I_3 \end{bmatrix}, C = [\, I_3 \quad 0_{3\times3} \,], \tag{55}$$

Where $$A_1 = \begin{bmatrix} 0 & 0 & 0 \\ 0 & 3\omega_0^2 & 0 \\ 0 & 0 & -\omega_0^2 \end{bmatrix}, A_2 = \begin{bmatrix} 0 & 2\omega_0 & 0 \\ -2\omega_0 & 0 & 0 \\ 0 & 0 & 0 \end{bmatrix}, \tag{56}$$

and $\omega_0=0.0015$. Note that (55) and (56) represent the linearized equations of the relative translational dynamics, which are described by Clohessy-Wiltshire equations, and $x_i(t)=[\overline{\omega}_i^T(t), \vec{\omega}_i^T(t)]^T$ with being the position of agent i, $i=1, \ldots, 6$, in a three dimensional space.

In this example, all of the agents are subject to random initial conditions and we let $z_i(0)=0$ and $\gamma_i(0)=1$, $i=1, \ldots, 6$.

In addition, we choose $$K_1 = \begin{bmatrix} 25.46 & -0.005 & 0 & 15.84 & 0 & 0 \\ 0.005 & 25.46 & 0 & 0 & 15.84 & 0 \\ 0 & 0 & 25.46 & 0 & 0 & 15.84 \end{bmatrix}, \tag{57}$$

$$K_2 = \begin{bmatrix} 14.14 & -0.003 & 0 \\ 0.003 & 14.14 & 0 \\ 0 & 0 & 14.14 \end{bmatrix},$$

and $\alpha=5$, where Assumptions 1 and 2 are satisfied. For $\xi_i^*$, $i=1, \ldots, 6$, we choose $\xi_1^*=[2\ 0\ 0]^T$, $\xi_2^*=[1\ -1\ 0]^T$, $\xi_3^*=[-1\ -1\ 0]^T$, $\xi_4^*=[-2\ 0\ 0]^T$, $\xi_5^*=[-1\ 1\ 0]^T$, and $\xi_6^*=[1\ 1\ 0]^T$, which yields to an uniform hexagon desired multiplex formation on a two dimensional space. Finally, we let $c(t)=[0.1t\ 2.5\sin(0.02t)\ 0]^T$ and select the scaling factor for the density of the resulting formation to be $\gamma^*(t)=0.5$ for $t\in[0, 80)$ seconds, $\gamma^*(t)=1$ for $t\in[80, 160)$ seconds, and $\gamma^*(t)=1.5$ for $t\geq 160$ seconds (in order to have a bounded time rate of change of $\gamma^*(t)$, we use a low-pass filter to smoothen the transition between $\gamma^*(t)$ changes).

Figure 2:
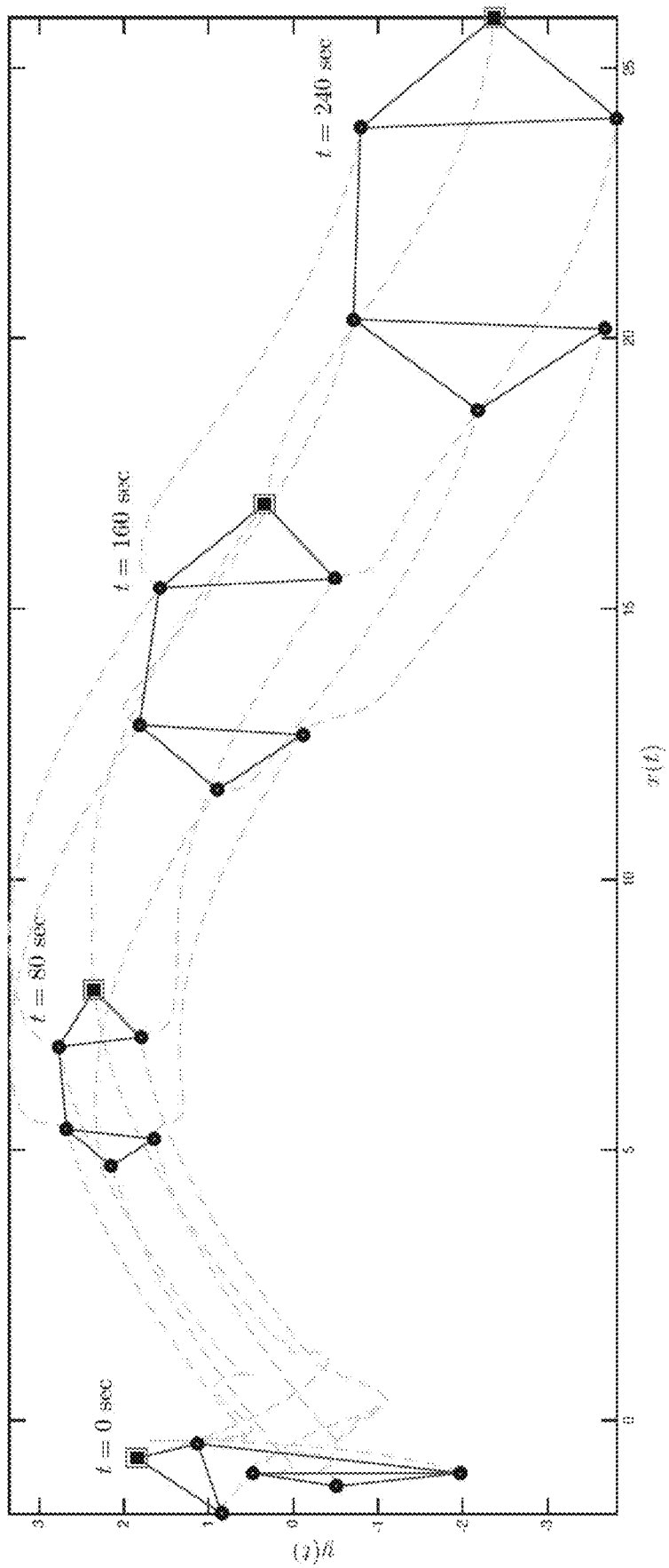
FIG. 2 is a diagram that represents a response of a multiagent system having a distributed control architecture, according to some embodiments.

FIG. 2 is a diagram that represents a response of the multiagent system 100 having the proposed distributed control architecture. Referring to FIG. 2, a square denotes the capable agent 110, circles denote the other agents 120, solid lines denote the connected, undirected graph topology, and dashed lines denote trajectories of the six agents including the capable agent 110 and the other agents 120, in a two dimensional space. The results of spatial control of the multiagent system 100 by the distributed control architecture, as shown in FIG. 2, clearly indicates that the proposed distributed control architectures allows the capable agent to spatially alter density of the resulting formation while tracking a dynamic target of interest. As noted above with respect to FIG. 1, in one embodiment, the capable agent 110 and the other agents 120 represent six respective vehicles comprising a capable vehicle 110 and other vehicles 120 in a formation of vehicles of the multiagent system 100. The six vehicles comprise peer-to-peer communication systems for distributed spatial control of the formation of vehicles. Solid lines between the vehicles represent an example of peer-to-peer communication paths for exchanging navigation information among the six vehicles of the multiagent system 100. The peer-to-peer communications may include local measurements made by each of the vehicles that are utilized for the distributed spatial control of the formation of vehicles. Furthermore, the dashed lines represent trajectories of the six vehicles, which indicates that the proposed distributed control architecture allows the capable agent 110 vehicle to spatially alter density of the resulting formation of the vehicles while tracking a dynamic target of interest.

Figure 3:
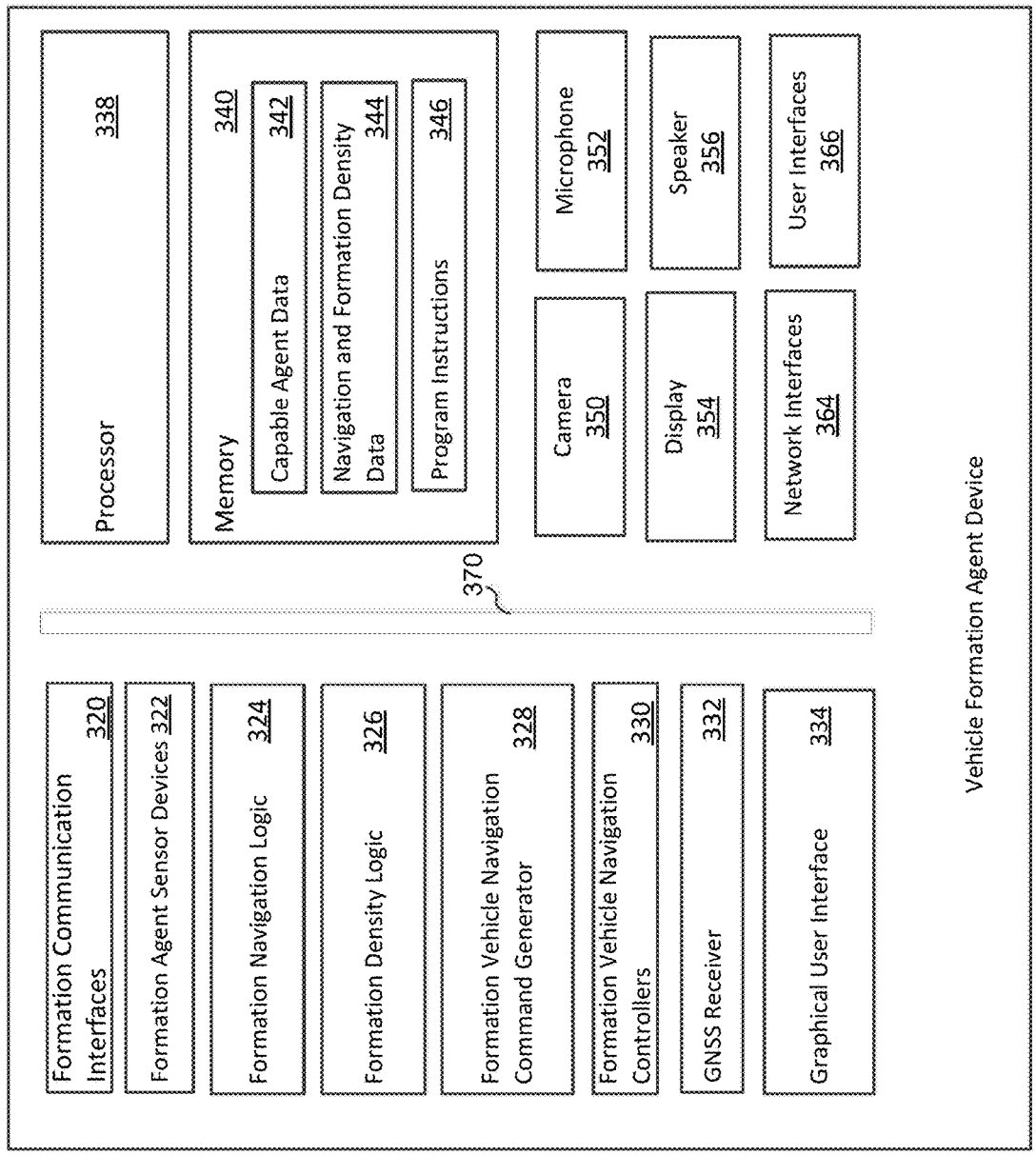
FIG. 3 is a block diagram of a vehicle formation agent device of a spatially evolving multiagent formation having a peer-to-peer information exchange architecture, according to some embodiments.

FIG. 3 is a block diagram of a vehicle formation agent device of a spatially evolving multi-agent formation having a peer-to-peer information exchange architecture. Referring to FIG. 3 there is shown a vehicle formation agent device 300 that includes, among other things, formation communication interfaces 320, formation agent sensor devices 322, formation navigation logic 324, formation density logic 326, a formation vehicle navigation command generator 328, formation vehicle navigation controllers 330, a GNSS receiver 332, a graphical user interface 334, an electronic processor 338, a memory 340, a camera 350, a microphone 352, a display device 354, a speaker device 356, a network interface 364, user interfaces 366 and an input/output (I/O) interface 370.

The vehicle formation agent device 300 may be similar or substantially the same as a capable agent 110 or one of the other agents 120 in the multiagent system having a distributed control architecture, as described with respect to FIG. 1 and FIG. 2. Other agent devices 120 of a formation may be referred to as following agent devices 120. The vehicle formation agent device 300 may comprise a single device or may comprise a plurality of devices connected to or integrated within a formation vehicle platform. The formation vehicle platform may comprise any suitable autonomous underwater, ground, aerial, or space vehicle that is operable to travel as a member of a formation having distributed control architecture as described herein. A formation vehicle platform may be configured to transport passengers or may be an unmanned vehicle platform. The formation vehicle platform may be controlled by the vehicle formation agent device 300 to travel as a member of a formation or swarm of vehicles that communicate formation course direction information and formation density information via peer-to-peer communications among a plurality of vehicles that travel as members of the formation.

A formation of the vehicles may be referred to as a swarm and may comprise a plurality of vehicles that travel over time in a one dimensional spatial system, a two dimensional spatial system, or a three dimensional spatial system to reach a common destination. The common destination may be a fixed destination or one that changes position over time. For example, a formation may pursue or follow a target vehicle or an object. The direction of travel of the formation may change over time. The direction of travel of the formation may be initiated by a vehicle formation agent device 300 that functions as a capable agent 110. The direction of travel of the formation may further be implemented autonomously by one or more vehicle formation agent devices 300 that function as other agents 120 of the formation. Moreover, the formation may have a formation density that may change overtime. For example, the formation density may be based on the distance between formation vehicles that are members of the formation, and may be implemented autonomously by each vehicle formation agent 300 of the formation vehicles.

In one embodiment, a formation vehicle platform may comprise an automobile that travels over land or roads to pursue a moving target vehicle. In another embodiment, the formation vehicles may comprise flying crafts such as planes or drones that travel in the air or space towards a moving target. The moving target may travel in the air or space or along the ground. In another embodiment, a plurality of vehicles of a formation may travel towards a fixed destination. For example, vehicles traveling in a formation may carry passengers, goods, or materials to a common fixed destination. However, the disclosure is not limited to any specific type of vehicle platform or mode of travel, and any suitable vehicle platform or mode of travel may be controlled by the vehicle formation agent device 300 to be a member of a formation of vehicles.

The vehicle formation agent device 300 shown in FIG. 3 includes elements that enable the agent device 300 to function as a capable agent device 110 and as another agent device 120. The one or more other agent devices 120 of a formation may be referred to as following agent devices 120. A formation may comprise one or more capable agent devices 110 and one or more following agent devices 120. For example, a formation may have one capable agent device 110 and one hundred following agent devices 120, or two capable agent devices and five hundred following agent devices 120 may comprise a formation. However, the disclosure is not limited to a specific number of, or ratio of, capable agent devices 110 and following agent devices 120. Furthermore, although the vehicle formation agent device 300 shown in FIG. 3 includes elements that enable the device 300 to function as a capable agent device 110 and as another agent device 120, in some embodiments, the vehicle formation agent device 300 may include only features needed for functioning as a following agent 120. Alternatively the vehicle formation agent device 300 may include only features needed for functioning as a capable agent 120.

A vehicle formation agent device 300 that operates as a capable agent 110 may be referred to as a capable agent device 300. A vehicle formation agent device 300 that operates as one of the other agents 120 may be referred to as a following agent device 300. A vehicle formation agent device 300 may refer to either or both of a capable agent device 300 or a following agent device.

The formation navigation logic 324 may determine a direction for a course of travel in one, two, or three dimensions for a vehicle platform connected to the vehicle formation agent device 300. For example, the formation navigation logic 324 may determine when, where, and how a connected vehicle platform should change its spatial orientation and to what degree its spatial orientation should change in its course of travel within a formation. In one embodiment, the formation navigation logic 324 may utilize location information from the GNSS receiver 332 and may utilize navigation mapping software and USGS data, for example, to determine the course of travel. The navigation mapping software may track the location of the vehicle formation agent device 300 based on the GNSS location information. In some embodiments, the formation navigation logic 324 may utilize information received via one or more of the formation agent sensor devices 322 to determine the course of travel. For example, the formation agent sensor devices 322 may include ultrasonic sensors, infrared (IR) sensors, cameras with vision processing, a light detection and ranging system (LIDAR), peer-to-peer wireless radio communication, a sound navigation and ranging (SONAR) system, and the like. For example, the information from the formation agent sensor devices 322 may provide the location or relative location of one or more other vehicles or objects that the vehicle formation agent device 300 and its connected platform vehicle are following. The one or more other vehicles or objects may be a target of interest, such as a vehicle or object that the formation as a whole is following or following. Moreover, the one or more other vehicles or objects sensed by the formation agent sensor devices 322 may include one or more other vehicles of a formation that the vehicle formation agent device 300 is a member of and travelling among. This form of sensing of the other vehicles of the formation may be referred to peer-to-peer communication among vehicles of the formation, and may enable a plurality of vehicle formation agent devices 300 of the formation to each autonomously determine their own direction of travel, speed and/or formation density distance.

A capable agent device 300 may serve as a leader of a formation of vehicles, and may receive or determine its own navigation parameters, for example, for direction of travel and speed, in a variety of ways. In one embodiment, when the vehicle formation agent device 300 functions as a capable agent device 300, the formation navigation logic 324 may determine a course direction for the capable agent device 300 based on instructions received via a wireless interface of the formation communication interfaces 320, from an external control station 360 (see FIG. 1). In this regard, the external control station 360 may be external to the formation of vehicles that the formation agent device 300 is a member of, and may be a stationary external control station or a moving external control station. Furthermore, communications between the capable agent device 300 and the external control station 360 are external to the peer-to-peer communications that occur among the members of the formation that the capable agent device 300 is a member of.

A capable agent device 300 may communicate with the external control station 360 based on any suitable wireless technology or protocols. For example, the external communications may be transmitted via wireless wide area, local area, or personal area networks. Furthermore, the external communications may be implemented using, without limitation, cellular, satellite, WiFi, Bluetooth, two-way radio, half duplex radio, and military or public safety communication systems. The external control station 360 may communicate direction and/or formation density information only with capable agent devices 300, and may not provide direction and/or formation density information to any of the following agent devices 300. Furthermore, the external control station 360 and the capable agent device 300 may not have a global knowledge of the state of the formation that the vehicle formation agent device 300 is a member of and travelling among. For example, the location, direction of travel and/or formation density of all of the following agent devices 300 may not be known to, and are not communicated by the external control station 360, the capable agent device 300, or the following agent devices 300. Instead, the direction of travel and formation density of following agent devices 300 travelling among a formation, depend on one or more of peer-to-peer communication, local measurements, and autonomous navigation determination. In other words, the external control station 300 may provide navigation and/or formation density control information only to the capable agent device 300.

In some embodiments, the vehicle platform connected to a capable agent device 300 may be a piloted vehicle. The pilot of the vehicle platform may provide navigation and or formation density control input to the capable agent device 300 via the graphical user interface 334 or by piloting the vehicle platform of the capable agent device 300. The pilot input may be received in addition to, or in place of, the information received from the external control station 360. The pilot's and/or external control station 360 control input may communicated peer-to-peer to one or more following agent devices 300, and may be further propagated peer-to-peer throughout the formation.

In some embodiments, the formation navigation logic 324 and the formation density logic 326 may determine navigation and formation density parameters for formation vehicle navigation commands based on input from one or more formation agent sensor devices 322 and location information received from the GNSS receiver 332. For example, the navigation and formation density parameters may be based on sensor information received while the vehicle platform and the vehicle formation agent device 300 are trained on the target of interest and encounter objects or obstacles along a course traveled while tracking the target of interest. Alternatively, the navigation and formation density parameters for formation vehicle navigation commands may be based on program instructions stored in the capable agent memory 340 and/or sensor 322 information received while the capable agent travels along a programmed course.

In some embodiments, there may be more than one capable agent device 300 that functions to lead a formation of following vehicles. The multiple capable agent devices 300 may not communicate with each other. However, if the multiple capable agent devices 300 propagate different peer-to-peer commands to the following agent devices 300 of the formation, for example, for different formation density scaling factors, the scale factors may eventually reach a consensus value in the formation, for example, an average of the different scale factors.

The formation density logic 326 may determine a distance for the vehicle platform of the vehicle formation agent device 300 to keep away from other vehicles that are members of the formation. For example, the capable agent device 300 may communicate one or more formation density parameters via peer-to-peer communications with one or more following agent devices 300 of the formation. The formation density parameters may serve to scale the density of vehicles in the formation up or down. The capable agent device 300 may receive formation density information from the control station 360, via pilot input, or may sense a need for a change in formation density in order for the formation to perform a task. For example, the formation agent sensor devices 322 may sense obstructions for the formation to avoid, or a narrow passageway that the formation may traverse such that the vehicles of the formation move closer together or further apart to perform the task.

The formation vehicle navigation command generator 328 may generate commands to the vehicle platform connected to the vehicle formation agent 300. The commands may be generated utilizing information received from the formation navigation logic 324 and the formation density logic 326. The commands may control the direction of travel of the vehicle platform and the distance of the vehicle platform from any other vehicle formation agent 300 vehicle platforms that are travelling as a member of the same formation. The speed of following agent devices 300 of a formation may depend directly or indirectly on the speed of the capable agent device 300 of the formation. The speed of the capable agent device may be controlled by the control station 360, a pilot, or the speed of an object or vehicle that the capable agent device 300 is following.

The formation vehicle navigation command generator 328 may generate navigation commands for peer-to-peer communication to one or more neighboring following agent devices 300. The navigation commands for neighboring following agent devices 300 are communicated between agents and may include an agent's current position, scaling factor (to control the formation's density), rotation angle (to control the formation's orientation), and a local integral state vector (to construct the local control).

The formation vehicle navigation controllers 330 may comprise one or more control interfaces to, for example, steering, elevation, speed, or braking systems in the vehicle platform that the vehicle formation agent device 300 is connected to. The formation vehicle navigation controllers 330 may communicate the generate formation vehicle navigation commands to the steering, elevation, speed, or braking systems in order for the vehicle platform to perform as a member of the formation and perform formation tasks.

In some embodiments, the electronic processor 338 may be communicatively coupled to, the I/O interface 370, one or more the formation communication interfaces 320, the formation agent sensor devices 322, the formation navigation logic 324, the formation density logic 326, the formation vehicle navigation command generator 328, the formation vehicle navigation controllers 330, the GNSS receiver 332, the graphical user interface 334, the electronic processor 338, the memory 340, the camera 350, the microphone 352, the display device 354, the speaker device 356, the network interface 364 and the user interfaces 366.

The memory 340 may store program instructions 346 that when executed by the processor 338 may cause the processor 338 to perform or support functions of the vehicle formation agent device 300 according to the embodiments.

In various embodiments, electronic processor 338 may be a uniprocessor system including one electronic processor 338, or a multiprocessor system including several electronic processors 338 (e.g., two, four, eight, or another suitable number). Electronic processors 338 may be any suitable processor capable of executing instructions. For example, in various embodiments, the electronic processors 338 may implement any of a variety of instruction set architectures (ISAs), such as the x86, PowerPC, SPARC, or MIPS ISAs, or any other suitable ISA. In multiprocessor systems, each of the electronic processors 338 may commonly, but not necessarily, implement the same ISA.

In some embodiments, at least one electronic processor 338 may be a graphics processing unit. A graphics processing unit or GPU may be considered a dedicated graphics-rendering device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

The memory 340 may be configured to store program instructions 346 and/or data 342 and 344 accessible by the electronic processor 338 and/or by the formation navigation logic, 324, the formation density logic 326, the formation vehicle navigation command generator 328, and/or the formation vehicle navigation controllers 330, among other elements of the vehicle formation agent device 300. In various embodiments, the memory 340 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments, are shown stored within the memory 340 as program instructions 346 and data storage 342 and 334. In other embodiments, program instructions and/or data may be received, sent or stored upon different types of computer-accessible media or on similar media separate from the memory 340 or vehicle formation agent device 300. Moreover, in some embodiments, a database that is accessible via the network interface 364 may store, among other things, data for implementing desired functions, such as those described above for various embodiments. Generally speaking, a computer-accessible medium may include storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 364.

In one embodiment, I/O interface 370 may be configured to coordinate I/O traffic between processor 338, system memory 340, one or more of the formation communication interfaces 320, the formation agent sensor devices 322, the formation navigation logic 324, the formation density logic 326, the formation vehicle navigation command generator 328, the formation vehicle navigation controllers 330, the GNSS receiver 332, the graphical user interface 334, and any peripheral devices in the vehicle formation agent device 300, including network interface 364 or other peripheral interfaces, such as the camera 350, microphone 352, display 345, speaker 356, and user interfaces 366. In some embodiments, I/O interface 370 may perform any necessary protocol, timing or other data transformations to convert data signals from one component (e.g., the memory 340) into a format suitable for use by another component (e.g., processor 338). In some embodiments, I/O interface 370 may include support for devices attached through various types of peripheral buses, such as a variant of the Peripheral Component Interconnect (PCI) bus standard or the Universal Serial Bus (USB) standard, for example. In some embodiments, the function of I/O interface 370 may be split into two or more separate components, such as a north bridge and a south bridge, for example. In addition, in some embodiments some or all of the functionality of I/O interface 370, such as an interface to memory 340, may be incorporated directly into processor 338.

The network interface 364 may be configured to allow data to be exchanged between the vehicle formation agent device 300 and other devices attached to a network, such as other computer systems, a database, or between nodes of the vehicle formation agent device 300. In various embodiments, network interface 364 may support communication via wired or wireless general data networks, for example: via telecommunications/telephony networks such as voice networks or digital fiber communications networks; via storage area networks such as Fiber Channel SANs, or via any other suitable type of network and/or communications protocol.

The user interfaces may support, in some embodiments, one or more of display terminals, keyboards, keypads, touchpads, scanning devices, voice or optical recognition devices, or any other devices suitable for entering or retrieving data by one or more vehicle formation agent device 300. Multiple user input/output devices may be present in the vehicle formation agent device 300 or may be distributed on various nodes of the vehicle formation agent device 300. In some embodiments, similar input/output devices may be separate from the vehicle formation agent device 300 and may interact with one or more nodes of the vehicle formation agent device 300 through a wired or wireless connection, such as over network interface 364.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated vehicle formation agent device 300 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from the vehicle formation agent device 300 may be transmitted to the vehicle formation agent device 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from the vehicle formation agent device 300 may be transmitted to the vehicle formation agent device 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Figure 4:
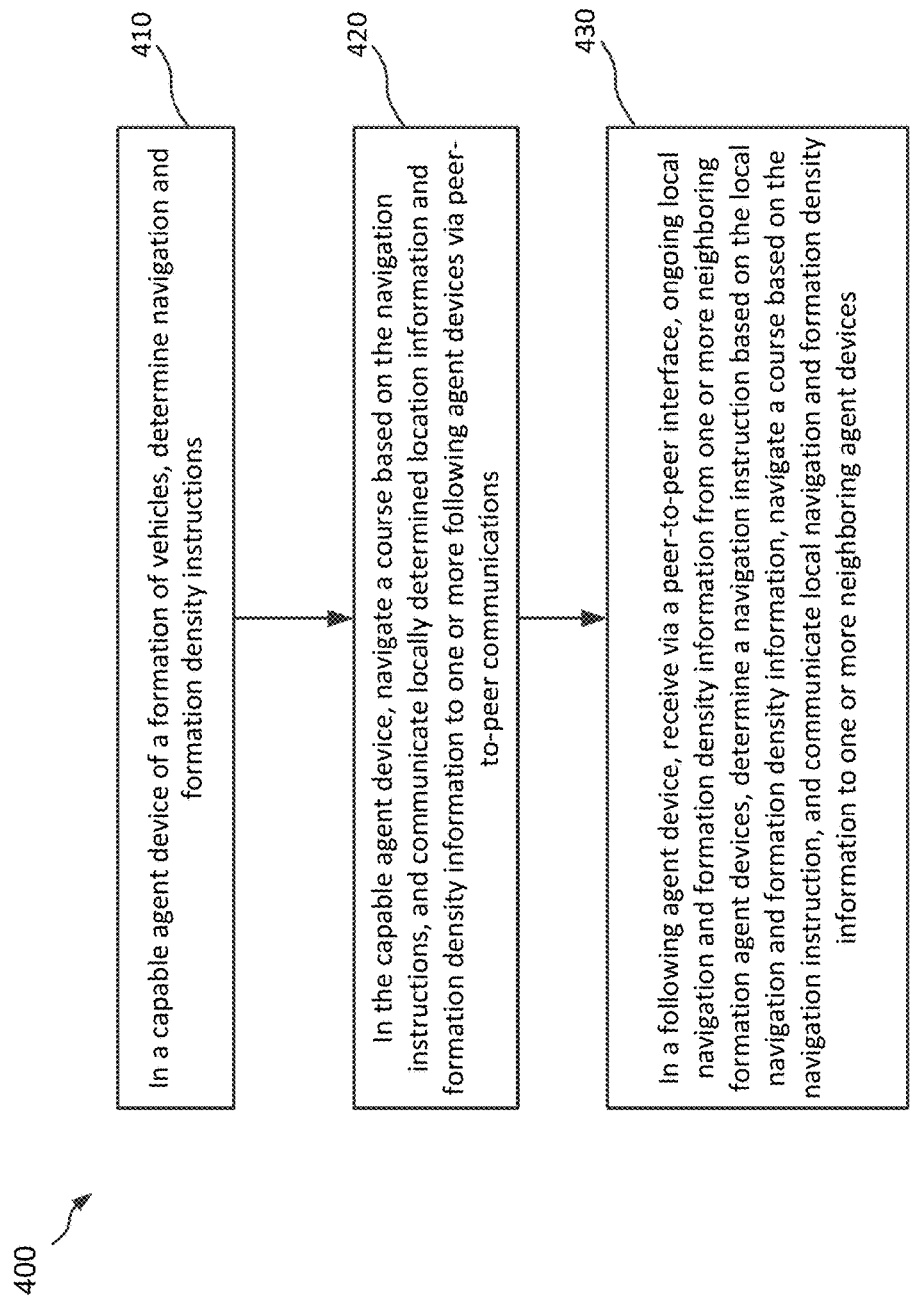
FIG. 4 is a flow chart for a method of spatially evolving a multiagent formation having a peer-to-peer information exchange architecture, according to some embodiments.

FIG. 4 is a flow chart for a method of spatially evolving a multiagent formation having a peer-to-peer information exchange architecture according to embodiments.

In step 410, a capable agent device 300 of a formation of vehicles determines navigation and formation density instructions. Information for determining the navigation and/or formation density instructions may be received from one or more of an external control station 360, a pilot of the capable agent device 300, program instructions 346 stored in the capable agent device 300, and/or sensor data from the formation agent sensor devices 322 that is generated while tracking a target of interest or performing a formation task. For example, the capable agent 300 may be leading a formation of vehicles including one or more following agent devices 300. The formation of vehicles may follow or track a target of interest, travel to a destination, and/or perform a task, for example.

In step 420, the capable agent device 300 navigates a course based on the navigation instructions, and communicates its locally determined navigation and formation density information to one or more following agent devices 300 via peer-to-peer communications. The peer-to-peer communications may be transmitted by the capable agent device 300 or received by the following agent device 300 via the formation communication interfaces 320 and/or the formation agent sensor devices. For example, formation density information may be broadcast by the capable agent device 300 via a Bluetooth interface in the formation communication interfaces 320 to its neighboring following agent devices 300, and received by the following agent devices 300 via a Bluetooth interface of their formation communication interfaces 320. The neighboring following agent devices 300 may also receive peer-to-peer formation navigation information such as direction of travel and speed information from the capable agent device 300. For example, the peer-to-peer navigation information may be received via formation agent sensor devices 322 of the following agent devices 300, such as cameras with vision processing and/or a light detection and ranging system (LIDAR), while tracking the capable agent device 300. The form of peer-to-peer communication is not limited to any type of communication technology. However, location and/or navigation information for the vehicle formation agent devices 300 of the formation is not globally known and is not globally communicated to the vehicle formation agent devices 300 of the formation.

In step 430, one or more following agent devices 300 of the formation of vehicles receive ongoing navigation information and formation density information via their respective peer-to-peer interfaces of their formation communication interfaces 320 and/or their formation agent sensory devices 322. The ongoing navigation and density information may be received at each of the following agent devices 300 from any respective neighboring capable agent device 300 and/or following agent devices 300. Navigation instructions for travelling in the formation are locally determined at each of the following agent devices 300 based on the received ongoing navigation and formation density information. Each of the following agent devices 300 navigates a course based on its respective locally determined navigation instructions. Furthermore, each of the one or more following agent devices 300 may communicate ongoing locally determined navigation information and/or formation density information to one or more neighboring following agent devices 300 via their respective formation communication interfaces 320.

The various methods as illustrated in the Figures and described herein represent example embodiments of methods. The methods may be implemented in software, hardware, or a combination thereof. The order of method may be changed, and various elements may be added, reordered, combined, omitted, modified, etc.

The proposed distributed control architecture provides an improvement over current vehicle formation control methods. Current methods lack an information exchange infrastructure that enables spatially evolving multiagent formations without using an exchange of global system information. Systems that rely on the exchange of global system information for formation control are not practical for cases involving large numbers of agents and low-bandwidth peer-to-peer communications. For multiagent systems with first-order agent dynamics, information exchange rules represented by a network having multiple layers (multiplex information networks) can be designed for enabling spatially evolving multiagent formations. The embodiments propose a novel generalized multiplex information networks architecture for spatial control of multiagent systems. The multiagent systems have realistic, general information networks that are utilized for formation density control of the multiagent systems. The proposed approach allows capable agents to spatially alter density of the resulting formation while tracking a target of interest—without requiring global information exchange ability. System-theoretic stability and convergence properties of the proposed distributed control architecture were derived and discussed. The illustrative numerical result demonstrates the efficacy of the proposed system and methodology.

Various modifications and changes may be made as would be obvious to a person skilled in the art having the benefit of this disclosure. It is intended that the present embodiments embrace all such modifications and changes and, accordingly, the above description to be regarded in an illustrative rather than a restrictive sense.

Thus, the embodiments provide, among other things, systems and methods for distributed spatial control of a formation of vehicles without the communication of global spatial control parameters. Various features and advantages are set forth in the following claims.

What is claimed is:

1. A method for distributed spatial control of a formation of vehicles, the method comprising:
   receiving, via a peer-to-peer communication interface system of a first vehicle of the formation of vehicles, the peer-to-peer communication interface system configured to communicate according to a multiplex information network that comprises a plurality of layers, the peer-to-peer communication interface providing at least a first intralayer communication link via one of the plurality of layers, and a second intralayer communication link via a different layer of the plurality of layers:
      the peer-to-peer communication interface system receiving, via the first intralayer communication link, peer-to-peer direction of travel information, the peer-to-peer direction of travel information indicating a course direction for the first vehicle of the formation of vehicles while travelling as a member of the formation of vehicles; and
      the peer-to-peer communication interface system receiving, via the second intralayer communication link, peer-to-peer formation density information, the peer-to-peer formation density information indicating a distance to maintain from other vehicles of the formation of vehicles while travelling as a member of the formation of vehicles; and
   generating, by the first vehicle, a formation vehicle self-navigation command for navigating a vehicle platform of the first vehicle of the formation of vehicles when travelling in one dimensional, two dimensional, or three dimensional space as a member of the formation of vehicles, the formation vehicle self-navigation command based on the peer-to-peer direction of travel information and the peer-to-peer formation density information;
   wherein the peer-to-peer direction of travel information is based on locally determined spatial relationships of a portion of the vehicles of the formation of vehicles.

2. The method of claim 1, wherein the peer-to-peer direction of travel information received via the peer-to-peer communication interface system is received from a capable agent formation vehicle of the formation of vehicles that determines a direction of travel for the capable agent formation vehicle based on a direction of travel instruction from a control station or local measurements made during pursuit of a moving target.

3. The method of claim 2, wherein the first vehicle is operable to function as the capable agent formation vehicle of the formation of vehicles.

4. The method of claim 1, wherein the peer-to-peer formation density information received via the peer-to-peer communication interface system is received from a capable agent vehicle that receives a formation density instruction from a control station or determines the formation density information based on sensor measurements of the capable vehicle of the formation of vehicles.

5. The method of claim 1, wherein the peer-to-peer communication interface system comprises a sensor device that senses a relative position or direction of motion of another vehicle of the formation of vehicles.

6. The method of claim 1, wherein the peer-to-peer communication interface system comprises a peer-to-peer wireless communication interface that receives the formation density information from another vehicle of the formation of vehicles.

7. The method of claim 1, wherein the peer-to-peer direction of travel information and the peer-to-peer formation density information are received via different interfaces of the peer-to-peer communication interface system.

8. The method of claim 1 further comprising:
   broadcasting, via a wireless peer-to-peer communication interface of the first vehicle of the formation of vehicles, location information of the first vehicle of the formation of vehicles for use by other neighbouring vehicles of the formation of vehicles to determine self-navigation commands in the other neighbouring vehicles, the location information of the first vehicle of the formation of vehicles determined by the first vehicle of the formation of vehicles.

9. A formation vehicle for distributed spatial control of a formation of vehicles, the formation vehicle comprising:
   a peer-to-peer communication interface system;
   a vehicle platform for travelling in one dimensional, two dimensional, or three dimensional space among the formation of vehicles;
   an electronic processor and a memory that stores program instructions, the program instructions when executed by the electronic processor cause the electronic processor to:
      receive, via the peer-to-peer communication interface system, the peer-to-peer communication interface system configured to communicate according to a multiplex information network that comprises a plurality of layers, the peer-to-peer communication interface system providing at least a first intralayer communication link via one of the plurality of layers, and a second intralayer communication link via a different layer of the plurality of layers:
         the peer-to-peer communication interface system receiving, via the first intralayer communication link, peer-to-peer direction of travel information, the peer-to-peer direction of travel information indicating a course direction for the formation vehicle while travelling as a member of the formation of vehicles; and
         the peer-to-peer communication interface system receiving, via the second intralayer communication link and via a second peer-to-peer communication interface, peer-to-peer formation density information, the peer-to-peer formation density information indicating a distance to maintain from other neighbouring vehicles of the formation of vehicles while travelling as a member of the formation of vehicles; and
      generate a formation vehicle self-navigation command for navigating the vehicle platform when travelling in one dimensional, two dimensional, or three dimensional space as a member of the formation of vehicles, the formation vehicle self-navigation command based on the peer-to-peer direction of travel information and the peer-to-peer formation density information;
      wherein the peer-to-peer direction of travel information is based on locally determined spatial relationships of a portion of the vehicles of the formation of vehicles.

10. The formation vehicle of claim 9, wherein the peer-to-peer direction of travel information received via the peer-to-peer communication interface system is received from a capable agent formation vehicle of the formation of vehicles that determines a direction of travel for the capable agent formation vehicle based on a direction of travel instruction from a control station or local measurements made during pursuit of a moving target.

11. The formation vehicle of claim 10, further comprising a network wireless communication interface, wherein the formation vehicle is operable to function as the capable agent formation vehicle of the formation of vehicles and receive direction of travel information and formation density information from a control station via the network wireless communication interface.

12. The formation vehicle of claim 9, wherein the peer-to-peer formation density information received via the peer-to-peer communication interface system is received from a capable agent vehicle that receives a formation density instruction from a control station or determines the formation density information based on sensor measurements of the capable vehicle of the formation of vehicles.

13. The formation vehicle of claim 9, wherein the peer-to-peer communication interface system comprises a sensor device that senses a relative position or direction of motion of another formation vehicle of the formation of vehicles.

14. The formation vehicle of claim 9, wherein the peer-to-peer communication interface system comprises a peer-to-peer wireless communication interface that receives the formation density information from another formation vehicle of the formation of vehicles.

15. The formation vehicle of claim 9, wherein the peer-to-peer direction of travel information and the peer-to-peer formation density information are received via different interfaces of the peer-to-peer communication interface system.

16. The formation vehicle of claim 9 further comprising a Global Navigation Satellite System (GNSS) receiver and location determination software, the formation vehicle further:
broadcasts, via a wireless peer-to-peer communication interface of the peer-to-peer communication interface system, location information of the formation vehicle for use by other neighbouring vehicles of the formation of vehicles to determine self-navigation commands in the other neighbouring vehicles, the location information of the formation vehicle determined by the location determination software of the formation vehicle.

17. The formation vehicle of claim 9, wherein the peer-to-peer communication interface system includes at least one of:
a camera, a light detection and ranging system (LIDAR) communication interface, a peer-to-peer wireless radio communication interface, a Bluetooth communication interface, or a sound navigation and ranging (SONAR) communication interface.

18. A large-scale multiagent system comprising:
a plurality of agents;
a network; and
a controller in communication with the network according to at least one layer of a plurality of layers of a multiplex information network, the controller interfacing with the at least one layer for intralayer communication for a specific purpose, the controller configured to generate a distributed control signal for each of the agents that allows the agents to generate a desired formation and density for tracking a target, each of the agents defining a node of the multiplex information network.

19. The system of claim 18, wherein the agents do not have an ability to exchange global information.

20. The system of claim 18, wherein at least one of the agents is a capable agent.

* * * * *